(12) United States Patent
Terry et al.

(10) Patent No.: US 11,421,810 B2
(45) Date of Patent: Aug. 23, 2022

(54) DOUBLE VENTED TRANSITION ELBOW

(71) Applicant: NIBCO INC., Elkhart, IN (US)

(72) Inventors: Andrew J. Terry, Sturbridge, MA (US); Christopher William Mason, Granger, IN (US); Lisa Lyon, Goshen, IN (US)

(73) Assignee: NIBCO Inc., Elkhart, IN (US)

( * ) Notice: Subject to any disclaimer, the term of this patent is extended or adjusted under 35 U.S.C. 154(b) by 245 days.

(21) Appl. No.: 16/744,278

(22) Filed: Jan. 16, 2020

(65) Prior Publication Data

US 2021/0222814 A1 Jul. 22, 2021

(51) Int. Cl.
*F16L 43/00* (2006.01)
*F16L 55/07* (2006.01)

(52) U.S. Cl.
CPC ............... *F16L 55/07* (2013.01); *F16L 43/00* (2013.01)

(58) Field of Classification Search
CPC .......... F24D 19/085; F16L 55/07; F16L 43/00
See application file for complete search history.

(56) References Cited

U.S. PATENT DOCUMENTS

| | | | | |
|---|---|---|---|---|
| 440,864 A * | 11/1890 | Knight | ............... | F16L 27/0845 285/147.1 |
| 1,365,025 A * | 1/1921 | Elder | ............... | F16L 15/08 285/31 |
| 1,861,314 A * | 5/1932 | Mcandrew | ............... | F16L 41/005 285/89 |
| 2,404,259 A * | 7/1946 | Veitch | ............... | E03C 1/122 285/179.1 |
| 2,562,967 A * | 8/1951 | Teglund | ............... | F16L 41/021 285/130.1 |
| 4,130,303 A * | 12/1978 | George | ............... | E04B 1/585 138/115 |
| 10,281,351 B2 | 5/2019 | Branecky et al. | | |
| 2013/0319564 A1 | 12/2013 | Torres et al. | | |

(Continued)

FOREIGN PATENT DOCUMENTS

| | | |
|---|---|---|
| CN | 205224191 | 5/2016 |
| CN | 207130834 | 3/2018 |
| DE | 102012112852 | 6/2013 |

(Continued)

OTHER PUBLICATIONS

Push-To-Connect Brass Male Adapter Elbow Fitting, Easy Pipe Transitions (https://www.sharkbite.com/products/brass-push-male-adapter-elbow) (printed Dec. 6, 2019).

(Continued)

*Primary Examiner* — Matthew Troutman
*Assistant Examiner* — James A Linford
(74) *Attorney, Agent, or Firm* — Price Heneveld LLP (57) ABSTRACT

A double vented transition elbow can be used when venting a variety of applications, such as for baseboard heaters and hot water heating systems. The double vented elbow allows venting in one orientation or in a different orientation when the elbow is rotated. One end of the elbow couples to copper tubing, while the other end of the elbow couples to PEX tubing. Thus, the elbow not only allows for venting in two different orientations, it also allows for the transition from copper to PEX tubing within the same fitting.

20 Claims, 5 Drawing Sheets

(56) References Cited

U.S. PATENT DOCUMENTS

2017/0254466 A1* 9/2017 Olsson .................... E03F 5/041

FOREIGN PATENT DOCUMENTS

FR         2840671      12/2003
JP         4615691 B2   1/2011

OTHER PUBLICATIONS

½" PEX×½" Copper Pipe Elbow, Crimp Style Brass PEX Fitting (https://www.pexuniverse.com/1-2-pex-x-1-2-female-sweat-elbow) (printed Dec. 6, 2019).
93-97 LT1 Camaro & Firebird Aluminum Intake Elbow with Nirous Port (https://maggperformance.com/product/93-97-lt1-camaro-firebird-aluminum-intake-elbow-with-nitrous-port/) (printed Jan. 15, 2020).

* cited by examiner

DOUBLE VENTED TRANSITION ELBOW

BACKGROUND OF THE INVENTION

The present invention relates to a double vented elbow. The double vented elbow can be used in a variety of applications, such as hot water heating systems. Vent ports can be used to get rid of unwanted air in fluid systems, including in hot water heating systems. Typically some type of air bleeder valve is connected to the vent port to provide venting. These air bleeder valves can be manually or automatically aerated. Traditional elbows used in venting designs only have one vent port. In addition, traditional elbows are not transition fittings and are, thus, typically have both ends designed to be attached to the same type of tubing or pipe.

Thus, it would be desirable to have an elbow fitting that can transition from copper piping to PEX tubing and that can be used in different orientations, permitting use of a vent port is coming from the PEX fitting side of the elbow or a vent port coming off of the copper fitting side of the elbow.

SUMMARY OF THE INVENTION

One aspect of the present invention is a double vented plumbing elbow. The double vented plumbing elbow has a body with a first opening and a second opening and an elbow fluid passage therebetween. A first vent port is located on the elbow body adjacent the first opening. The first vent port is in fluid communication with the elbow fluid passage. A second vent port is located on the elbow body adjacent the second opening. The second vent port is also in fluid communication with the elbow fluid passage. The elbow body has an approximately 90° angle, with the second opening being at an approximately 90° angle to the first opening. In addition, the second vent port is also at an approximately 90° angle to the first vent port. Both vent ports are in the same plane as the approximately 90° angle between second opening and the first opening.

Another aspect of the present invention is a double vented plumbing elbow. The double vented plumbing elbow has an elbow body having a first opening with a fitting configured to connect to a copper pipe and a second opening with a barbed exterior surface for connecting to a PEX tube. The elbow body also has a bent elbow portion that is located between the first opening and the second opening. A fluid passage extends from the first opening, through the bent elbow portion of the body to the second opening. A first vent port is located on the elbow body adjacent to the first opening. A second vent port is located on the elbow body adjacent to the second opening.

Yet another aspect of the present invention is a transition plumbing elbow assembly. The transition plumbing elbow assembly has an elbow body having a first end, a second end, and a curved elbow portion therebetween. The first end includes a copper fitting, while the second end has a barbed PEX tube fitting. The elbow body has an approximately 90° elbow located between the first end and the second end. The elbow body has a fluid a passageway extending from the first end through the elbow to the second end. The elbow body also has a first vent port that is located between the copper fitting and the elbow. A second vent port is located between the elbow and the barbed PEX tube fitting. The transition plumbing elbow assembly also includes a venting fitting attached to either the first vent port or the second vent port. A vent port plug is attached to the other vent port.

These and other features, advantages, and objects of the present invention will be further understood and appreciated by those skilled in the art by reference to the following specification, claims, and appended drawings.

DETAILED DESCRIPTION

For purposes of description herein, the terms "upper," "lower," "right," "left," "rear," "front," "vertical," "horizontal," and derivatives thereof shall relate to the invention as oriented in FIGS. 1-10. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
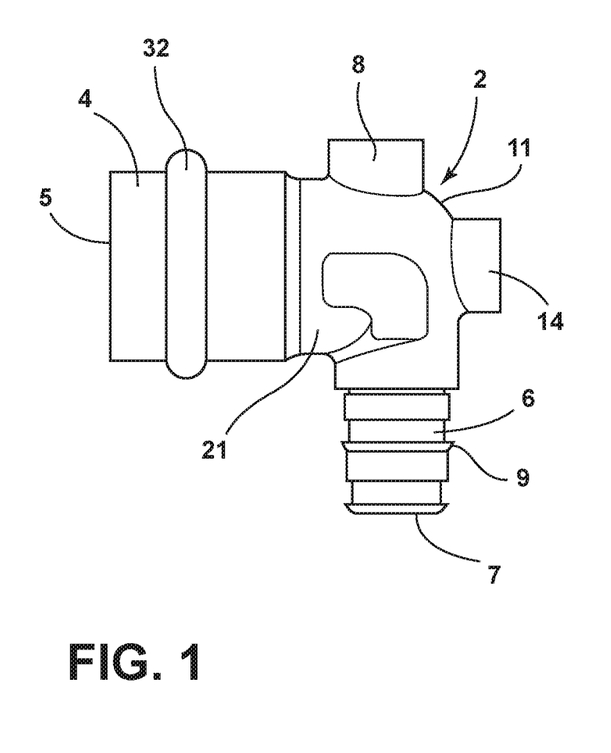
FIG. 1 is an elevational view of an embodiment of a double vented transition elbow of the present invention utilizing a press fitting.
Figure 5:
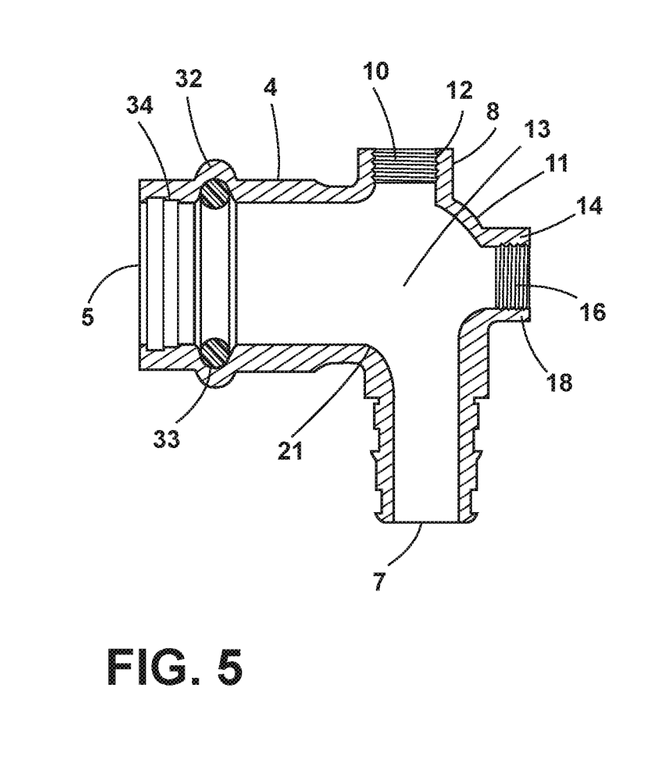
FIG. 5 is a cross-sectional view of the double vented transition elbow shown in FIG. 1.
Figure 8:
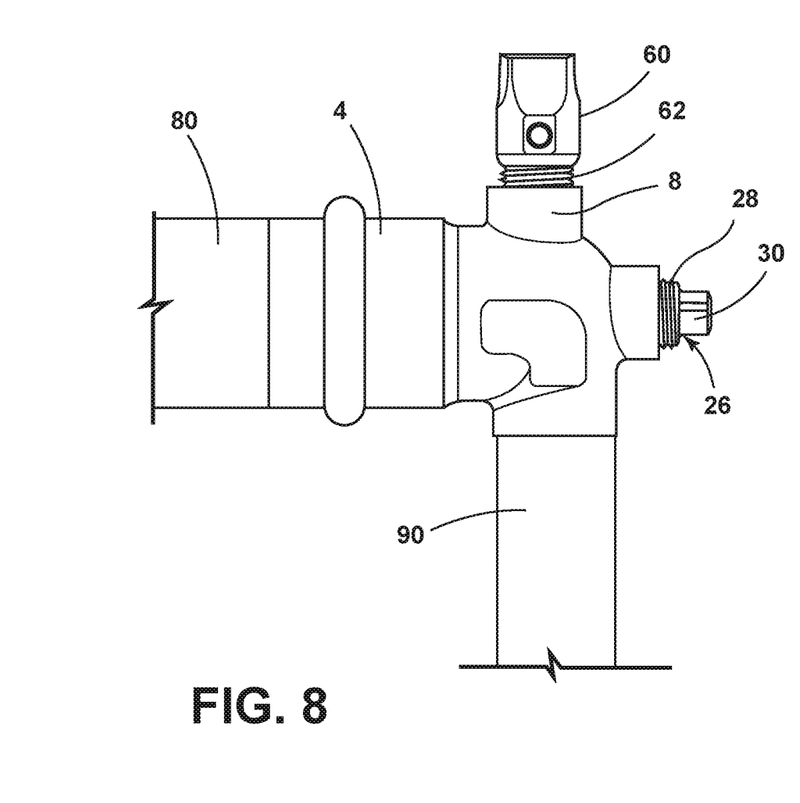
FIG. 8 is an elevational view of the double vented transition elbow shown in FIG. 3 connected to a copper pipe and a PEX tube.

FIG. 1 illustrates one embodiment of the double vented transition elbow 2. The double vented transition elbow 2 includes an elbow body 21 with a first end 4 and a second end 6. The first end 4 has a fluid passageway 5, while the second end 6 has a fluid passageway 7. As illustrated in FIG. 5, the fluid passage extends from the fluid passageway 5 through the elbow fluid passageway 13 to the second fluid passageway 7. As illustrated in FIG. 1, the second end 6 has a barbed surface 9 that is configured to connect to a PEX tube. In the illustrated embodiment, the exterior surface of the second end 6 has a plurality of raised surfaces to create the barbed exterior 9. The barbed exterior 9 can include a number of raised surfaces, different shaped surfaces, and different spacing between the raised surfaces. One or more of the barbs can include at least one angled surface that makes it easier for a PEX tube 90 to be installed on the barbed surface 9 of second end 6, as illustrated in FIG. 8.

The double vented transition elbow 2 also includes a first vent port 8, shown in a generally vertical position in FIG. 1, and a second vent port 14, shown in a generally horizontal position. The first vent port 8 has a vent port opening 10 that is in fluid communication with the elbow fluid passageway 13. The first vent port 8 also has a threaded surface 12. In the illustrated embodiment, the threaded surface 12 is located on the interior of the vent port opening 10. However, alternative embodiments can include a threaded surface on the exterior surface of the first vent port 8. Similarly, the second vent port 14 has an opening 16 and a threaded surface 18. In the illustrated embodiment (FIG. 5), the threaded surface 18 is located on the interior of opening 16. Again, in alternative embodiments, the threaded surface 18 can be located on the exterior of second vent port 14. The opening 16 in threaded vent port 14 is also in fluid communication with the elbow fluid passageway 13.

In FIG. 1, the first end 4 of the double vented transition elbow 2 has a press fit copper fitting 32. As illustrated in FIG. 5, the press fit copper fitting 32 utilizes at least one O-ring 33 and a plurality of internal ridges 34 that when pressed by a tool will seal around a pipe, as illustrated in FIG. 8.

Figure 2:
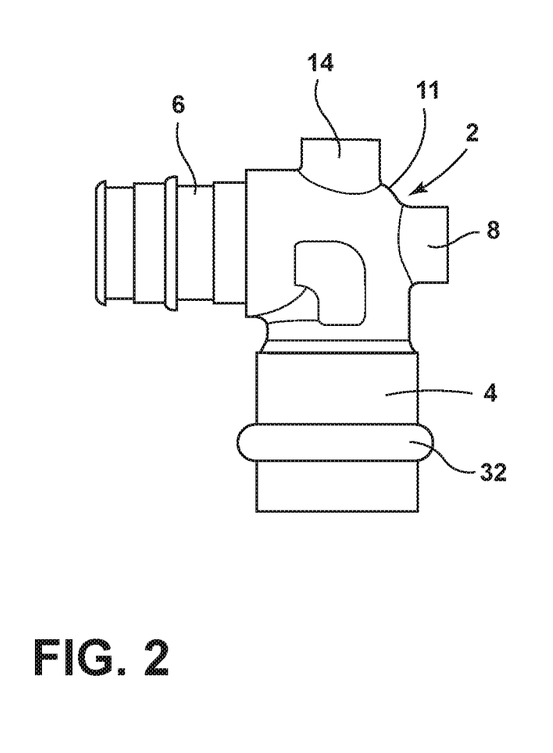
FIG. 2 is an elevational view of another embodiment of a double vented transition elbow of the present invention utilizing a press fitting.
Figure 3:
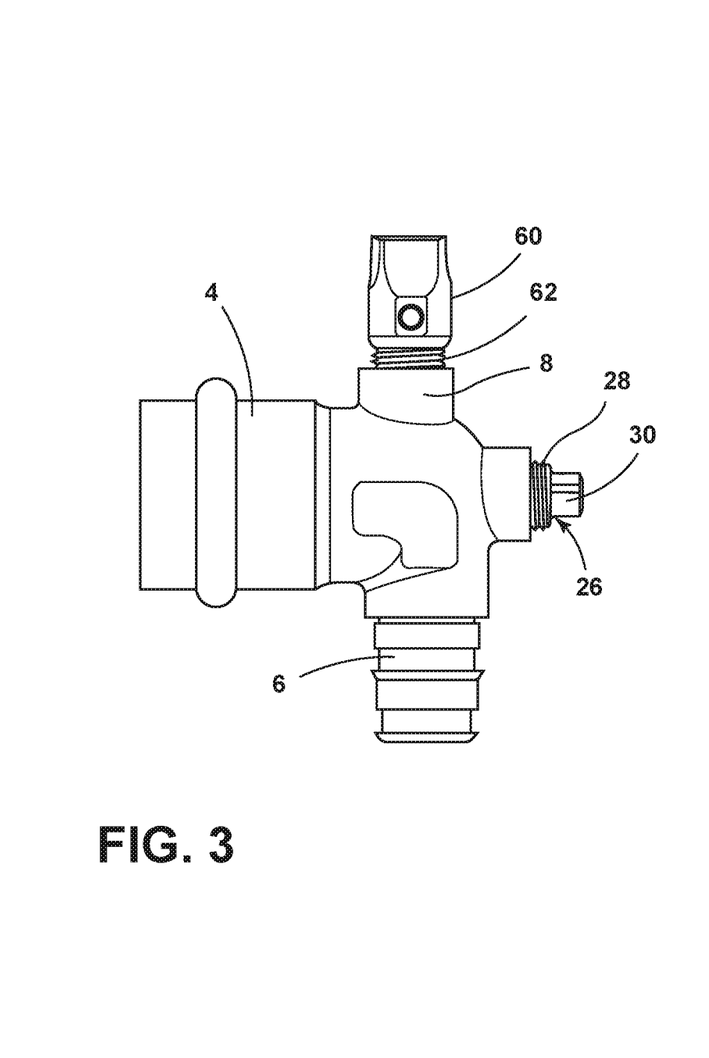
FIG. 3 is an elevational view of the double vented transition elbow shown in FIG. 1 with an air bleeder valve installed in the vertical vent port and a vent port plug installed in the horizontal vent port.
Figure 10:
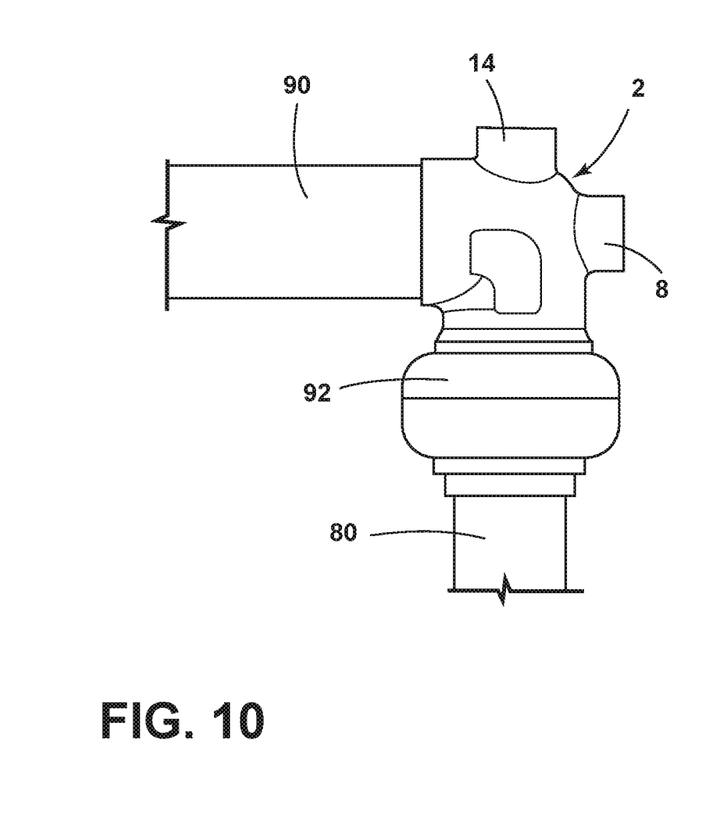
FIG. 10 is an elevational view of the double vented transition elbow shown in FIG. 9 with the PEX tube in a generally horizontal position.

FIG. 2 illustrates the rotation of the double vented transition elbow 2 with the second end 6 in a generally horizontal position. In that arrangement, a PEX tube 90 can be installed in a generally horizontal manner thus having the second vent port 14 located in a generally vertical direction, as shown in FIG. 10.

As illustrated in FIGS. 1, 2, 5, and 6, the width of fluid passage 7 on the second end 6 can vary depending upon the size of the PEX tube 90 that is used. Similarly, the width of the fluid passage 5 in first end 4 can vary depending upon the width of the pipe. Moreover, a variety of different PEX or polymeric tubes can be used, including, but not limited to, PEX F1807, PEX F1960, and polymeric tubes provided that the second end 6 is configured for coupling to the corresponding tube.

Figure 7:
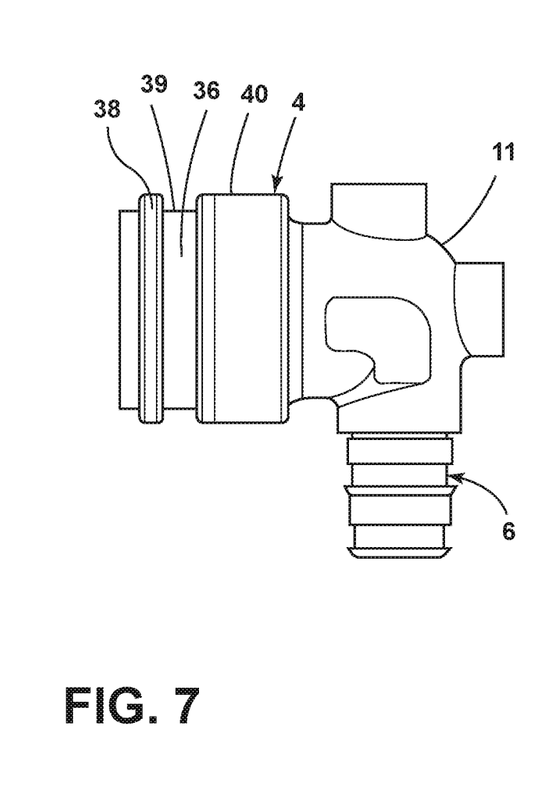
FIG. 7 is an elevational view of another embodiment of the double vented transition elbow utilizing a push-to-connect fitting with a release ring.

FIG. 7 illustrates a push-to-connect copper fitting 36 on the first end 4 of the double vented transition elbow 2. The push-to-connect fitting 36 has a release ring 38 and a cup 40 spaced apart from the release ring 38 by distance 39. The release ring 38 selectively deflects the tynes of a grab ring located on the inside of the push-to-connect fitting 36 to release a copper pipe when the release ring 38 is advanced toward cup 40.

Figure 9:
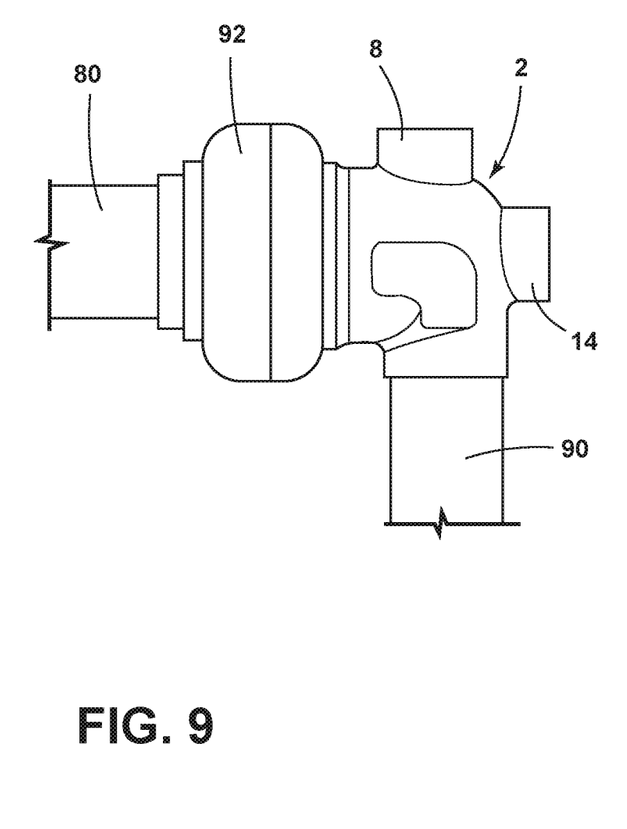
FIG. 9 is an elevational view of another embodiment of the double vented transition elbow utilizing a push fit coupling with a copper pipe in a generally horizontal position.

Yet another embodiment of a copper fitting utilized on first end 4 is a push fit coupling 92, which can be releasably connected to copper piping 80. Any type of fitting that connects to a copper tube or pipe can be used. In addition, the fittings on first end 4 can connect to non-copper piping or tubing, including, but not limited to, CPVC and iron.

As illustrated in FIG. 8, an air bleeder valve 60 can be connected to one of the vent ports 8, 14. In the embodiment illustrated in FIG. 8, the air bleeder valve 60 has a threaded portion 62 that connects to the threaded portion 12 of the vent port opening 10 in the first vent port 8. A vent plug 26 with threaded surface 28 and actuating protrusion 30 is coupled to the second vent port 14 in the illustrated embodiment. The protrusion 30 can include a square or hexagonal surface to assist in the installation or removal of the vent plug 26.

Figure 4:
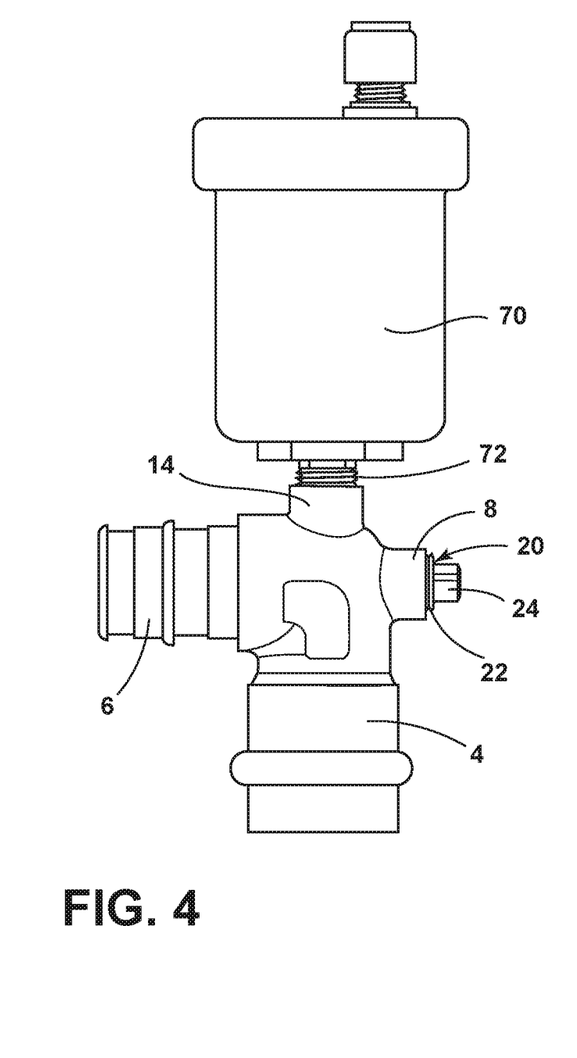
FIG. 4 is an elevational view of the double vented transition elbow shown in FIG. 2 with a float air ball valve installed in the vertical vent port and a cap installed in the horizontal vent port.

FIG. 4 illustrates the installation of a float air valve 70 to a second vent port 14 with threaded portion 72 coupled to the threaded portion 18 of vent port 14. In the embodiment shown in FIG. 4, a vent plug 20 is connected to the first vent port 8. The vent plug 20 has a threaded portion 22 that connects to the threaded portion 12 of the vent port opening 10 of the first vent port 8 and an actuating protrusion 24.

Figure 6:
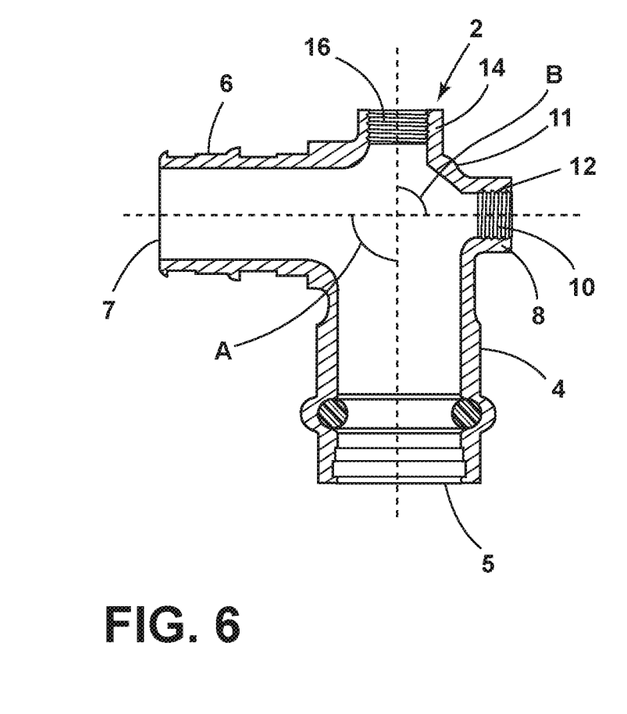
FIG. 6 is a cross-sectional view of the double vented transition elbow shown in FIG. 2.

In the illustrated embodiments, the double vented transition elbow 2 is an approximately 90° elbow. Thus, the first fluid passageway 5 on the first end 4 and the fluid passageway 7 on the second end 6 are located at an approximately 90° angle A as shown in FIG. 6. Similarly, the centerlines of the opening 16 in the second vent port 14 and the vent port opening 10 of the first vent port 8 are disposed at a generally 90° angle B. Also as illustrated in FIG. 6, the 90° angles A and B are within the same plane. This results in a curve 11 of the elbow body 21 being located between the first vent port 8 and the second vent port 14.

The elbow body 21, the first end 4, and the second end 6 can be made of the same material or as a unitary piece. Moreover, the elbow body 21 and one or both of the ends (4, 6) can be made of different materials or pieces that are coupled together. In the illustrated embodiments, the entire double vented transition elbow 2 is made as a unitary piece of metal. Such metal materials can include brass, copper, metallic alloys, or other material that contains some metallic material combined with a non-metallic material.

While the illustrated embodiments show the first end 4 as having the pipe fitting and the second end 6 as having the PEX fitting, the arrangements can be reversed. Moreover, while the illustrated embodiments show one of the vent ports (8, 14) in a generally vertical position, the double vented transition elbow 2 can be installed in a manner where neither vent port (8, 14) is in a generally vertical position. Moreover, while the illustrated embodiments show two different types of air bleeder valves, other types of air bleeding mechanisms whether manual, semi-automatic, or automatic, can be attached to either or both of the vent ports (8, 14).

While the illustrated embodiments show the transition from a copper pipe 80 to a PEX tub 90, the first end 4 and second end 6 can have other connections, some of which will provide a transition from one type or size of tubing/piping to another, while some will have the same type of fitting on both the first end 4 and the second end 6. Thus, the fittings could be: PEX to PEX; press fit to push fit; push fit to push fit; press fit to press fit; push-to-connect to press fit; and other combinations of PEX, press fit, push fit, push-to-connect, and traditional solder joints.

While the illustrated embodiments show an approximately 90° double vented transition elbow 2, the transition fitting with two vent ports can be applied to other shaped fittings, including, but not limited to, an approximately 45° plumbing elbow.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. In addition, while certain embodiments have shown threaded connections, the threaded connections could include tape or other sealing material in the threaded connection. In addition, the threaded connection could be replaced by other suitable connections or couplings, such as compression couplings or other couplings.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A double vented plumbing elbow, comprising:
    a single piece elbow body having a cylindrical first opening with a plurality of internal ridges, an O-ring groove, and an O-ring positioned within said groove, a cylindrical second opening, and an elbow formed at the intersection of the cylindrical first opening and the cylindrical second opening, said elbow having a convex outer surface and an elbow fluid passage;
    a first vent port in alignment with said cylindrical second opening, said first vent port having an opening with a threaded surface that extends to the exterior surface of the opening but not to the fluid passage in a raised boss located on the elbow body adjacent to said convex outer surface of said elbow, said first vent port in fluid communication with said elbow fluid passage;
    a second vent port in alignment with said cylindrical first opening, said second vent port, having an opening with a threaded surface that extends to the exterior surface of the opening but not to the fluid passage in a raised boss located on the elbow body adjacent to said convex outer surface of said elbow, said second vent port in fluid communication with said elbow fluid passage;
    wherein said second opening is at a 90° angle to said first opening;
    wherein said second vent port is at a 90° angle to said first vent port;
    wherein the convex outer surface is arched between the first and second vent ports; and
    wherein said first vent port and said second vent port have a smaller diameter than the diameter of the elbow fluid passage, and said O-ring has an internal diameter that is smaller than the diameter of the elbow fluid passage.

2. The double vented plumbing elbow of claim 1, wherein:
    said first opening has a push-to-connect fitting for coupling to a tube.

3. The double vented plumbing elbow of claim 2, wherein:
    said tube is a copper pipe.

4. The double vented plumbing elbow of claim 1, wherein:
    said second opening contains a barbed outer surface for connecting to a PEX tube.

5. The double vented plumbing elbow of claim 1, wherein:
    said first opening has a press fit connection for coupling to a tube using a press tool.

6. The double vented plumbing elbow of claim 5, wherein:
    said tube is a copper pipe.

7. The double vented plumbing elbow of claim 1, including an air bleeder valve coupled to the threaded opening of the first vent port or the second vent port.

8. A double vented plumbing elbow, comprising:
    a single piece elbow body having a cylindrical first opening with a plurality of internal ridges, an O-ring groove, and an O-ring positioned within said groove, a cylindrical second opening with a barbed exterior surface for connecting to a PEX tube, a bent elbow portion located between said first opening and said second opening formed at the intersection of the cylindrical first opening and the cylindrical second opening, said elbow having a convex outer surface and an elbow fluid passage;

a first vent port in alignment with said cylindrical second opening, said first vent port having an opening with a threaded surface that extends to the exterior surface of the opening but not to the fluid passage in a raised boss located on the elbow body adjacent to said convex outer surface of said elbow;

a second vent port in alignment with said cylindrical first opening, said second vent port having an opening with a threaded surface that extends to the exterior surface of the opening but not to the fluid passage in a raised boss located on the elbow body adjacent to said convex outer surface of said elbow;

wherein the convex outer surface is arched between the first and second vent ports; and wherein said first vent port and said second vent port have a smaller diameter than the diameter of the fluid passage, and said O-ring has an internal diameter that is smaller than the diameter of the fluid passage.

9. The double vented plumbing elbow of claim 8, wherein:
said first opening and said second opening are located on opposite ends of a 90° elbow.

10. The double vented plumbing elbow of claim 9, wherein:
said first vent port is at a 90° angle to said second vent port, with both vent ports being in the same plane as the 90° elbow angle.

11. The double vented plumbing elbow of claim 8, wherein:
said first vent port and said second vent port have threaded openings.

12. The double vented plumbing elbow of claim 8, wherein:
said first opening includes a press fit connection for coupling to a copper pipe using a press tool.

13. The double vented plumbing elbow of claim 8, wherein:
said first opening includes a push-to-connect fitting for coupling to a copper pipe.

14. The double vented plumbing elbow of claim 8, wherein said vent ports are in threaded openings in said raised bosses.

15. A transition plumbing elbow assembly, comprising:
a single piece elbow body having a first end, a second end, and a curved elbow portion with a convex outer surface formed between a cylindrical portion of said first end and a cylindrical portion of said second end;

wherein said first end includes a plurality of internal ridges, an O-ring, and an O-ring positioned within said O-ring groove, and said second end has a barbed PEX tube fitting;

wherein said curved body is a 90° elbow;

wherein said elbow body has a fluid passageway extending from said first end through said 90° elbow to said second end;

wherein said elbow body has a first vent port in alignment with said second end, said first end port having an opening with a threaded surface that extends to the exterior surface of the opening but not to the fluid passageway in a raised boss located adjacent to said convex outer surface;

wherein said elbow body has a second vent port in alignment with said first end, said second vent port having an opening with a threaded surface that extends to the exterior surface of the opening but not to the fluid passageway in a raised boss located adjacent to said convex outer surface between said 90° elbow and said barbed PEX tube fitting;

a venting fitting attached to either of said first vent port or said second vent port;

a vent port plug attached to the other vent port;

wherein the convex outer surface is arched between the first and second vent ports; and wherein said first vent port and said second vent port have a diameter that is less than the diameter of said fluid passageway of said elbow body and the internal diameter of said O-ring is smaller than the diameter of said fluid passageway.

16. The transition plumbing elbow assembly of claim 15, wherein:
said venting fitting is a float air valve.

17. The transition plumbing elbow assembly of claim 15, wherein:
said venting fitting is an air bleeder valve.

18. The transition plumbing elbow assembly of claim 15, wherein:
said venting fitting has a threaded male end.

19. The transition plumbing elbow assembly of claim 18, wherein:
said threaded male end of said venting fitting couples with a female threaded opening on said vent port.

20. The transition plumbing elbow assembly of claim 18, wherein:
said vent port plug has a male threaded end and an opposite end having a raised protrusion for turning said vent port plug.

* * * * *